United States Patent Office 3,795,638
Patented Mar. 5, 1974

3,795,638
STABILIZED POLYURETHANE COMPOSITIONS
Gerhard Grögler, Leverkusen, Germany, assignor to
Bayer Aktiengesellschaft, Leverkusen, Germany
No Drawing. Filed Feb. 2, 1972, Ser. No. 222,981
Claims priority, application Germany, Feb. 12, 1971,
P 21 06 726.5
Int. Cl. C08g 51/60
U.S. Cl. 260—45.9 R    3 Claims

ABSTRACT OF THE DISCLOSURE

Polyester containing compositions particularly polyester-urethanes, stabilized against hydrolysis and aging are prepared by incorporating therein a stabilizing amount of a N,N'-disubstituted N-(2-hydroxyalkyl)-urea or thiourea.

This invention relates to stabilized ester-containing compositions and to a process of preparing ester-containing compositions stabilized against hydrolysis and aging.

It is well known that polyurethanes of the polyester-urethane type are commonly prepared by reacting an hydroxyl terminated polyester with a polyisocyanate. These polyurethanes have many desirable qualities which make them suitable for numerous known applications. However, the use of polyesterurethanes in hydrolytic environments is limited due to decomposition of the ester groups of the polymer chain due to hydrolysis. Various techniques have been proposed to improve the stability of esters, polyesters, polyesteramides, polyesterurethanes and the like against hydrolysis and aging. One such technique is to employ carbodiimides as stabilizing agents for ester containing compositions according to, for example, Belgian Pat. 733,573. However, in many applications these stabilizing agents have too low a vapor pressure and have a tendency to migrate. Moreover, carbodiimides may have an adverse effect on and interfere when polyesters are cross-linked by reaction with polyfunctional isocyanates.

French Pat. 1,450,912 teaches the use of 2-imino-oxazolidines of the general formula:

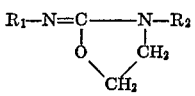

wherein $R_1$, is aryl and $R_2$ is alkyl or aryl, as stabilizing agents for ester containing compounds. However, these stabilizers are also subject to migration losses and in addition greatly accelerate the reaction between hydroxyl containing polyesters and polyisocyanates, particularly at elevated temperatures, thus making the polyaddition reaction difficult to control.

It is therefore an object of this invention to provide esters, polyesters, polyesteramides and polyesterurethanes devoid of the foregoing problems and disadvantages. A further object of this invention is to provide polyester-urethanes stabilized against hydrolysis and aging. Another object of this invention is to provide a method of stabilizing esters, polyesters, polyesteramides and polyesterurethanes against hydrolysis and aging.

The foregoing objects and others which will become apparent from the following description are accomplished in accordance with the invention, generally speaking, by providing compositions which contain ester groups stabilized against hydrolysis and aging by incorporating therein a stablizing amount of a N,N'-disubstituted N-(2-hydroxyalkyl)-urea or thiourea. Any composition containing repeating ester linkages

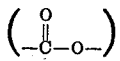

in the chain may be stabilized against hydrolytic degradation in accordance with the invention by incorporating in the ester containing composition from about 0.1 percent to about 5 percent, preferably from about 0.5 percent to about 1.5 percent, by weight based on the weight of ester containing composition of a N-(2-hydroxyalkyl)-urea or thiourea represented by the following general formulae:

(I)

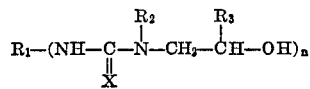

II)

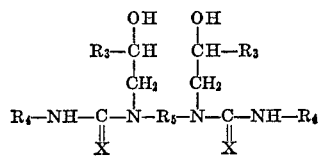

or (III)

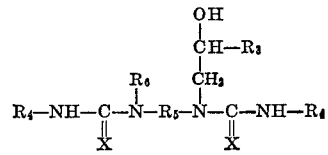

wherein $n$ is an integer of from 1 to 4;
X is oxygen or sulfur;
$R_1$ is an n-valent alkyl, alkenyl, cycloalkyl, cycloalkenyl, aryl, aralkyl or alkaryl radical which radicals may be substituted by halogen, hydroxyl, alkoxy, nitrile, ether, thioether or ester groups;
$R_2$ is an aliphatic or aromatic radical containing up to 18 carbon atoms which may be substituted by halogen, hydroxyl or cyano groups;
$R_3$ is hydrogen, methyl or ethyl;
$R_4$ is a mono-valent radical of the type, $R_1$; preferably $C_1$ to $C_6$ alkyl;
$R_5$ is $C_2$ to $C_6$ alkylene; and
$R_6$ is $C_1$ to $C_4$ alkyl.

Preferred stabilizing compounds are those of the general Formula I wherein $n$ is 1 or 2;
X is oxygen or sulfur;
$R_1$ is $C_1$ to $C_6$ alkyl, $C_2$ to $C_8$ alkylene; $C_6$ to $C_{12}$ aryl or $C_5$ to $C_7$ cycloalkyl;
$R_2$ is methyl or hydroxyethyl; and
$R_3$ is hydrogen or methyl.

It must however be stressed that the precise nature of the radical groups represented by $R_1$ to $R_6$ is largely immaterial in determining the suitability of a particular compound as a stabilizer for ester containing compositions. The essential factor responsible for imparting the stabilizing effect is the presence of urea or thiourea groups which contain only one NH bond and which carry a 2-hydroxyalkyl substituent on the other nitrogen atom.

Preparation of the antihydrolytic agents used according to the invention is carried out by known methods of preparative organic chemistry, such as for example, by the addition of mono- or polyisocyanates to N-substituted 2-hydroxyalkylamines at reaction temperatures of from 0° C. to 50° C. This addition reaction may be carried out either in solution or in bulk Suitable solvents are, for example, hexane, dioxane, benzene, toluene, tetrahydrofuran, chloroform, ether and the like The antihydrolytic agents to be used according to the invention may be liquid, crystalline, waxy or oily, compounds. They may also be added without previous purification.

The following mono- and polyisocyanates are some examples of suitable starting compounds for the preparation of the antihydrolytic agents to be used according to the invention:

methylisocyanate,
propylisocyanate,
allylisocyanate,
methoxymethylisocyanate,
butylisocyanate,
3-methoxypropylisocyanate,
hexadecylisocyanate,
cyclohexylisocyanate,
phenylisocyanate,
p-chlorophenylisocyanate,
o-tolylisocyanate,
p-ethoxyphenylisocyanate,
o-nitrophenylisocyanate,
benzylisocyanate,
m-isocyanatoethyl ester of cinnamic acid,
2,4-dichlorophenylisocyanate,
o-naphthylisocyanate,
o-diphenylisocyanate,
3-nitro-4-chlorophenylisocyanate,
tetramethylenediisocyanate,
hexamethylenediisocyanate,
1,4-phenylenediisocyanate,
1,4-cyclohexylenediisocyanate,
1,4-tolylenediisocyanate,
2,5-tolylenediisocyanate,
4-chloro-1,3-phenylenediisocyanate,
1,3,5-triethyl-2,4-phenylenediisocyanate,
6-methyl-2,4-diethyl-5-nitro-1,3-phenylenediisocyanate,
p-xylylenediisocyanate,
4,6-dimethyl-1,3-xylylenediisocyanate,
3-(-isocyanatoethyl)-phenylisocyanate,
4,4'-diphenyl-diisocyanate,
4,4'-diisocyanate-diphenyl ether,
4,4'-diisocyanato-dicyclohexylmethane,
4,4'-diisocyanato-diphenylmethane,
1,5-naphthylene-diisocyanate,
4,4'4''-triisocyanato-triphenylmethane and the like;

reaction products of diisocyanates with low molecular weight polyhydroxyl compounds, such as, for example, the reaction product of 3 mols of 2,4-diisocyanato-toluene with 1 mol of trimethylolpropane and the like; biuret polyisocyanates, for example, trisisocyanatohexyl-biuret which may be prepared by reacting hexamethylene-diisocyanate with water and the like.

Apart from these low molecular weight monoisocyanates and polyisocyanates, higher molecular weight monoisocyanates and polyisocyanates may be used for preparing the antihydrolytic agents to be used according to the invention, for example, the higher molecular weight isocyanates which may be prepared by reacting higher molecular weight polyethers or polyesters which contain terminal hydroxyl groups with excess diisocyanate. Instead of the above mentioned isocyanates, the corresponding isothiocyanates may be used for preparing the antihydrolytic agents to be used according to the invention.

Suitable reactants for the mono- or polyisocyanates used for the preparation of the antihydrolytic agents to be used according to the invention are any N-substituted 2-hydroxyalkylamines, especially 2 - hydroxyethylamines, such as for example, 2-methylaminoethanol,
1-methylamino-butanol-(2),
2-propylamino-ethanol,
2-hexylamino-ethanol, 1-butylamino-hexanol-(2),
2-dedecylaminoethanol,
2-hexadecylamino-ethanol,
2-stearylamino-ethanol,
2-cyclohexylamino-ethanol,
N,N'-bis-(2-hydroxyethyl) ethylenediamine,
N,N'-bis-(2-hydroxypropyl) ethylenediamine,
(2-hydroxyethyl) aniline,
2-(p-chlorophenylamino)-ethanol,
2-(p-methoxyphenylamino) ethanol,
2,2'-dihydroxy-diethylamine,
2,2'-dihydroxy-dipropylamine,
2-(2-methylaminoethylamino)-ethanol-(1),
2-(2-cyanoethylamino) ethanol-(1) and the like.

The antihydrolytic agents to be used according to the invention are suitable for stablizing any synthetic resins which contain ester groups from about 0.1 to about 5.0% by weight and preferably from about 0.5 to about 1.5% by weight based on the weight ester containing resin, of the antihydrolytic agents to be used according to the invention is generally sufficient for adequately stabilizing the synthetic resins which have ester groups. The antihydrolytic agents may either be added to the finished synthetic resins which are to be stabilized or they may be added to the starting components used for the preparation of the synthetic resins which contain ester groups. The last mentioned method of addition is to be recommended particularly for the preparation of stabilized polyurethanes which contain ester groups, and the antihydrolytic agent may be added either to the polyisocyanate component or to the polyol component.

Polyesterurethanes, i.e., polyurethanes which contain ester groups may be particularly effectively protected against hydrolysis by employing the stabilizers according to the invention. Any polyurethanes which have been prepared from hydroxyl compounds which contain ester groups are regarded as polyesterurethanes such as, for example, polyurethane foam resins, polyurethane elastomers, polyurethane coating materials and the like.

The polyesterurethanes may be prepared by the well known isocyanate polyaddition process by reacting ester group containing hydroxyl compounds such as, for example, polyester polyols, with polyisocyanates in the presence of other auxiliary agents and additives well known to the art. The N,N'-disubstituted N-(2-hydroxalkyl) urea or thiourea stabilizing agents are preferably used in a quantity of from about 0.5 percent to 5.0 percent by weight based on the weight of polyurethane and the stabilizing agent may be added to any one of the starting components either before or during the preparation of the polyurethane.

The antihydrolytic agents used according to the invention are suitable not only for stabilizing polyurethane resins which contain ester groups but also for stabilizing any other synthetic resins which contain ester groups such as, for example, polyesters of dibasic dicarboxylic acids such as phthalic acid, terephthalic acid or adipic acid and polyhydric alcohols such as polycol, hexanediol, glycerol, trimethylolpropane, pentaerythritol and the like. Polymers or copolymers of acrylic or methacrylic acid esters which contain ester groups in the side chains, or vinyl esters such as polyvinyl acetate and the like. Synthetic resins of this type may be in the form of lacquers, foils, coatings, fibers, foams, elastomers, molded articles and the like.

The invention is further illustrated but it is not intended that it be limited by the following examples in which all parts and percentages are by weight unless otherwise specified.

EXAMPLE I (1A) About 200 parts of a glycol adipic acid ester of OH number 56 (about 1.7 percent OH) are dehydrated at about 130° C. and about 12 mm. pressure. About 37 parts of 1,5-naphthylene diisocyanate are introduced with stirring, an initial drop of the reaction temperature to about 120° C. is observed. After about 10 minutes, the temperature rises again to about 128° C., and about 4 parts of butane, 1,4-diol are stirred in and the melt is poured into molds heated to about 110° C. The molded product is removed from the mold after about 10 minutes. It is then re-heated to about 110° C. for about 12 hours, and a highly elastic polyurethane is obtained.

(1B) A polyurethane is prepared according to Example 1A except that about 2 parts of a bis-urea prepared from about 1 mol of hexamethylene-1,6-diisocyanate and about 2 mols of diethanolamine are mixed with the butane-1,4-diol.

(1C) A polyurethane is prepared according to Example 1B except that about 4 parts of the 2,2',6,6'-tetraisopropyldiphenyl carbodiimide of Belgian Pat. 733,573 are used in place of the bis-urea.

The test samples are exposed to the hydrolytic effect of water at about 80° C. for the time indicated in the following table which demonstrates the effect of hydrolysis and aging on the tensile strength * of the unstabilized polyurethane (1A), the polyurethane stabilized according to the invention (B) and the polyurethane stabilized in accordance with Belgian Pat. 733,573 (1C).

| Aging time, days | 0 | 1 | 3 | 5 | 7 | 9 |
|---|---|---|---|---|---|---|
| 1A | 327 | 294 | 225 | 135 | 35 | 22 |
| 1B | 323 | 304 | 280 | 265 | 242 | 220 |
| 1C | 330 | 273 | 204 | 147 | 216 | 117 |

Note.—Tensile strength values expressed in kg. wt./cm.² as determined n accordance with DIN 53,504.

As can be readily seen, in the unstabilized sample (1A), only about 6.7% of the initial tensile strength remains after 9 days exposure to water at 80° C., whereas in the same stabilized with bis-urea according to the invention (1B), the tensile strength is about 68% of the original value. In the sample stabilized according to Belgian Pat. 733,573, the tensile strength is only about 35.5% of the original value notwithstanding the use of double the amount of carbodiimide stabilizer compared with the bus-urea stabilizer of the invention.

The polyurethane stabilized according to the invention (1B) also has the following initial physical properties:

| Property | Determined by— | Value |
|---|---|---|
| Shore A Hardness | DIN 53505 | 84 |
| Elongation at break, percent | DIN 53504 | 678 |
| Tear propagation: | | |
| Resistance (Graves), kg.wt./cm.² | DIN 53515 | 52 |
| Impart elasticity, percent | DIN 53512 | 53 |
| Loss by abrasion, mm.³ | DIN 53516 | 32 |

EXAMPLE 2

The bis-urea of Example 1B is replaced by a bis-urea which is the reaction product of about 1 mol of hexamethylene diisocyanate and about 2 mols of 2-methylaminoethanol. The following effects on tensile strength by immersion in water at about 80° C. are observed:

| Aging time, days | 0 | 1 | 3 | 5 | 7 | 9 |
|---|---|---|---|---|---|---|
| Tensile strength, kg. wt./cm.² | 353 | 300 | 282 | 262 | 233 | 204 |

EXAMPLE 3

About 1 parts of N-methyl-N',N'-dihydroxyethyl-urea is dissolved in about 100 parts of a polyester of adipic acid, diethylene glycol and trimethylolpropane (molecular weight about 2,000, OH number 56) and the reaction mixture is heated to about 80° C. About 8.5 parts of an isomeric mixture of about 65% 2,4- and about 35% 2,6-tolylenediisocyanate are stirred in and the mixture is poured into a mold. After about 3 hours heating at about 110° C., an elastic material having a Shore A Hardness of 23 and which is suitable for pressure rolling is obtained (Sample 3A). An identical sample is prepared without the addition of the N-methyl-N',N'-dihydroxyethyl-urea (Sample 3B). Both samples are stored in a heating cupboard saturated with steam at about 80° C. for the length of time indicated in the following table and the reduction in Shore A Hardness is determined.

| Aging time, days | 0 | 1 | 2 | 3 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 3A | 23 | 20 | 18 | 17 | 17 | 15 | 15 | 15 | 14 | 14 | 13 | 13 | 12 | 11 | 11 | 10 | 8 | 7 | 6 | 4 |
| 3B | 24 | 20 | 17 | 15 | 12 | 10 | 8 | 5 | 3 | Cannot be determined | | | | | | | | | | |

EXAMPLE 4

A solution of about 3.0 parts of N-(p-ethoxyphenyl)-N'-methyl-N'-(2 - hydroxypropyl) - urea prepared from about 1 mol of ethoxyphenylisocyanate and about 1 mol of N-methylaminopropanol-(2) in about 200 parts of a polyester based on adipic acid and ethylene glycol (OH number, 56, molecular weight about 2,000) is reacted with about 36.5 parts of 1,5-naphthylenediisocyanate as described in Example 1 (Sample 4A). An identical sample is prepared without the addition of N-(p-ethoxyphenyl)-N'-methyl-N'-(2-hydroxypropyl)-urea (Sample 4B). The protection against decrease in tensile strength due to hydrolysis by the effect of water at about 80° C. in the stabilized (4A) and unstabilized (4B) samples is shown in the following table.

| Aging time, days | 0 | 1 | 3 | 5 | 7 | 9 |
|---|---|---|---|---|---|---|
| 4A | 297 | 272 | 217 | 172 | 127 | 103 |
| 4B | 340 | 306 | 202 | 130 | 81 | 30 |

EXAMPLE 5

A polyurethane elastomer containing about 1.0 part N-phenyl-N',N-dihydroxyethyl-thiourea prepared from about 1 mol of phenyl-isothiocyanate and about 1 mol of diethanolamine per 100 parts of a polyester is prepared according to Example 1A. The hydrolysis test of the molded product stabilized by the thiourea compound shows a remarkable improvement in the age resistance, as evidenced by the following tensile strengths.

| Aging time, days | 0 | 1 | 3 | 5 | 7 | 9 |
|---|---|---|---|---|---|---|
| Tensile strength, kg. wt./cm.² | 327 | 306 | 302 | 278 | 238 | 219 |

EXAMPLE 6

A mixture of butane-1,4-diol and a linear polyester of adipic acid and butane-1,4-diol is reacted with 4,4'-diisocyanato-diphenylmethane such that the NCO/OH ratio is about 1.02. After about one hour tempering of the samples, the thermoplastic polyurethane is granulated (Sample 6A). A second sample is prepared by adding about 1 part of N-cyclohexyl N',N'-dihydroxyethyl urea per 100 parts of granules and thoroughly mixed by tumbling (Sample 6B). The samples are injection molded at 180° C. to 200° C. and are stored for the length of time indicated below at about 100° C. in an atmosphere which is saturated with water vapor and the reduction in tensile strength is determined.

| Aging time, days | 0 | 3 | 6 | 9 |
|---|---|---|---|---|
| 6A | 383 | 42 | Cannot be determined | |
| 6B | 200 | 137 | 122 | 110 |

Although the invention is illustrated in considerable detail by the foregoing examples, it is to be understood that such exemplification is presented solely for purposes of illlustration and that many variations and substitutions can be made by those skilled in the art without departing from the spirit and scope of the invention.

What is claimed is:

1. A composition stabilized against hyrolysis comprising a polyester urethane and from about 0.5 percent to about 1.5 percent by weight based on the weight of poly-

*Tensile strength values expressed in kg. wt./cm.² as determined in accordance with DIN 53,504.

esterurethane of a stabilizing compound selected from the group of compounds having the formulae:

(I) 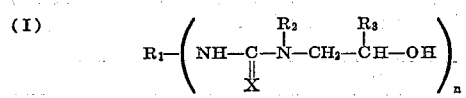

(II) 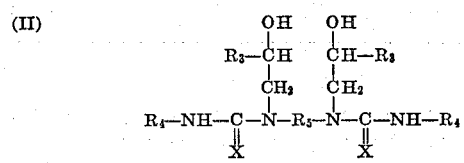

or (III) 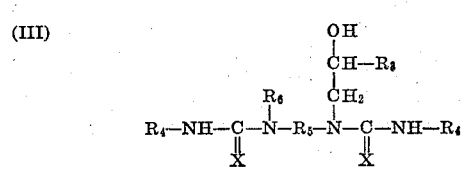

wherein
$n$ is an integer of from 1 to 4;
X is oxygen or sulfur;
$R_1$ is an n-valent alkyl, cycloalkyl, aryl, aralkyl or alkaryl radical which may be substituted by halogen or alkoxy groups;
$R_2$ is an aliphatic or aromatic radical containing up to 18 carbon atoms which may be substituted by hydroxyl groups;
$R_3$ is hydrogen, methyl or ethyl;
$R_4$ is a mono-valent radical of the type, $R_1$;
$R_5$ is $C_2$ to $C_6$ alkylene; and
$R_6$ is $C_1$ to $C_4$ alkyl.

2. A composition stabilized against hydrolysis comprising a polyesterurethane and from about 0.5 percent to about 1.5 percent by weight based on the weight of polyesterurethane of a stabilizing compound having the formula:

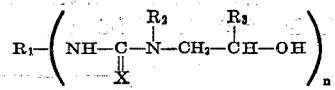

wherein $n$ is 1 or 2;
X is oxygen or sulfur;
$R_1$ is $C_1$ to $C_6$ alkyl or alkylene, $C_6$ to $C_{12}$ aryl or arylene, or $C_5$ to $C_7$ cycloalkyl or cycloalkylene;
$R_2$ is methyl or hydroxyethyl; and
$R_3$ is hydrogen or methyl.

3. The stabilized composition of claim 1 wherein the stabilizing compound is selected from the group consisting of N-methyl - N',N' - dihydroxyethyl-urea, N-(p-ethoxyphenyl)-N'-methyl-N'-(2-hydroxypropyl)-urea, N-phenyl-N',N'-dihydroxyethyl-thiourea and N-cyclohexyl N',N'-dihydroxyethyl-urea.

References Cited
UNITED STATES PATENTS

| | | | |
|---|---|---|---|
| 2,859,235 | 11/1958 | Schmidt et al. | 260—454 |
| 2,974,003 | 3/1961 | Koenig | 8—128 |
| 3,089,862 | 5/1963 | Fetterly et al. | 260—75 |
| 3,294,751 | 12/1966 | Beitchman | 260—75 |
| 3,388,100 | 6/1968 | Thoma et al. | 260—75 |
| 3,401,144 | 9/1968 | Britain | 260—45.8 |
| 3,420,787 | 1/1969 | Reymore, Jr. et al. | 260—2.5 |
| 3,476,933 | 11/1969 | Mendelsohn | 260—2.5 |
| 3,547,878 | 12/1970 | Stewart et al. | 260—45.9 |
| 3,577,383 | 5/1971 | Sedgwick | 260—45.9 |
| 3,663,506 | 5/1972 | Knopf et al. | 260—45.85 |

DONALD E. CZAJA, Primary Examiner

R. A. WHITE, Assistant Examiner

U.S. Cl. X.R.
260—77.5 SS